(12) United States Patent
Dangy-Caye et al.

(10) Patent No.: US 10,142,676 B2
(45) Date of Patent: Nov. 27, 2018

(54) RESIDENTIAL GATEWAY MAKING AT LEAST ONE PRIVATE MEMORY SPACE AVAILABLE

(71) Applicant: SAGEMCOM BROADBAND SAS, Rueil-Malmaison (FR)

(72) Inventors: Nicolas Dangy-Caye, Rueil-Malmaison (FR); Florent Raby, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 14/913,488

(22) PCT Filed: Aug. 12, 2014

(86) PCT No.: PCT/EP2014/067275
§ 371 (c)(1),
(2) Date: Feb. 22, 2016

(87) PCT Pub. No.: WO2015/024823
PCT Pub. Date: Feb. 26, 2015

(65) Prior Publication Data
US 2016/0212480 A1 Jul. 21, 2016

(30) Foreign Application Priority Data
Aug. 22, 2013 (FR) ...................................... 13 58115

(51) Int. Cl.
*H04N 21/436* (2011.01)
*H04N 21/258* (2011.01)
(Continued)

(52) U.S. Cl.
CPC ... *H04N 21/43615* (2013.01); *H04L 12/2834* (2013.01); *H04L 63/101* (2013.01);
(Continued)

(58) Field of Classification Search
None
See application file for complete search history.

(56) References Cited

U.S. PATENT DOCUMENTS 7,823,772 B2 * 11/2010 Vawter .................. G06Q 20/20
235/380
8,171,209 B2 * 5/2012 Bauernfeind ........... G06F 3/062
711/104
(Continued)

OTHER PUBLICATIONS

International Search Report for PCT/EP2014/067275 dated Sep. 15, 2014, three pages.
(Continued)

*Primary Examiner* — Joshua Joo
(74) *Attorney, Agent, or Firm* — Nixon & Vanderhye P.C.

(57) ABSTRACT

A residential gateway (110) has a memory space (132), with at least one private memory space (130), made available to at least one device (111; 112) connected to a local area network (120). The residential gateway has a table (140) managing rights of access to the private memory space or spaces; a device for receiving commands for access to the memory space and administrator commands for updating the access rights management table; a device for updating the table, on receipt of an administrator command coming from a predetermined device implementing an administrator module, and for ignoring any administrator command coming from another device; and a device (150) for ignoring any command for access to the private memory space or spaces, when the command is received coming from a device not identified in the table.

10 Claims, 3 Drawing Sheets

Figure 1:
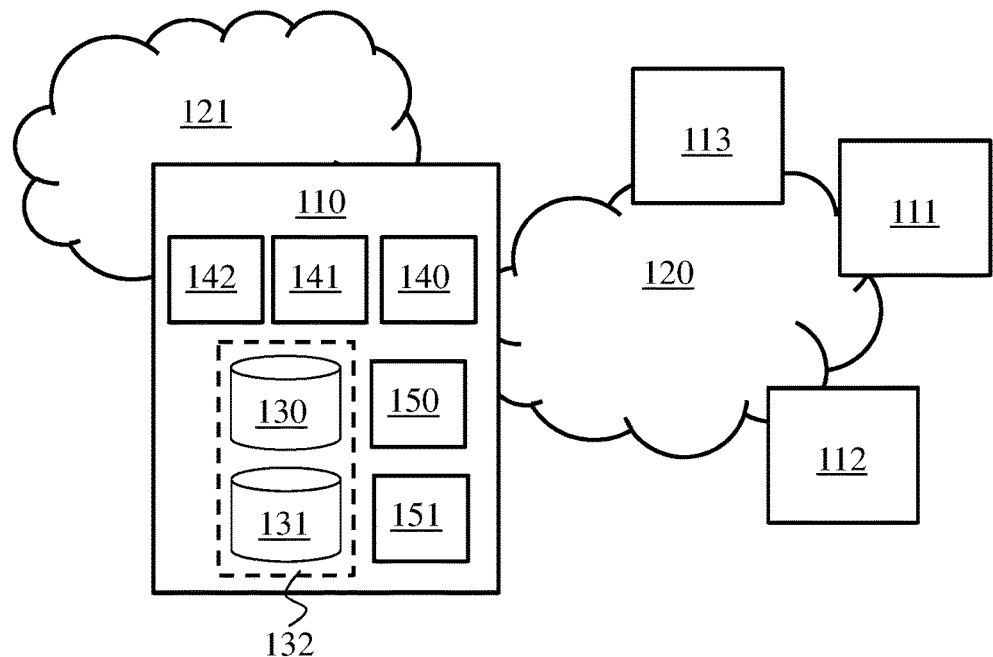

(51) Int. Cl.
*H04L 12/28* (2006.01)
*H04L 29/06* (2006.01)
*H04N 21/254* (2011.01)
*H04N 21/4627* (2011.01)

(52) U.S. Cl.
CPC ... *H04N 21/2541* (2013.01); *H04N 21/25816* (2013.01); *H04N 21/43622* (2013.01); *H04N 21/4627* (2013.01)

(56) References Cited

U.S. PATENT DOCUMENTS

| | | | | |
|---|---|---|---|---|
| 9,032,179 | B2* | 5/2015 | Desplanques | G06F 3/0605 711/173 |
| 2005/0257013 | A1 | 11/2005 | Ma | |
| 2005/0262268 | A1* | 11/2005 | Furukawa | H04L 45/60 709/245 |
| 2007/0028067 | A1* | 2/2007 | Hinrichs | H04L 63/083 711/164 |
| 2010/0122091 | A1 | 5/2010 | Huang et al. | |
| 2010/0146534 | A1 | 6/2010 | Chen et al. | |
| 2010/0269160 | A1* | 10/2010 | Kalonji | H04L 12/2898 726/4 |
| 2013/0290472 | A1* | 10/2013 | Coile | H04L 29/08549 709/214 |
| 2014/0201814 | A1* | 7/2014 | Barkie | H04L 63/107 726/4 |
| 2014/0282821 | A1* | 9/2014 | Adler | H04L 63/10 726/1 |
| 2016/0072790 | A1* | 3/2016 | Stuntebeck | H04L 63/08 726/4 |
| 2016/0080232 | A1* | 3/2016 | Dupre | H04L 41/0896 709/224 |
| 2017/0163653 | A1* | 6/2017 | Le | H04L 63/102 |

OTHER PUBLICATIONS

Landowski, et al., "AoE storage protocol over MPLS network", *Mass Storage Systems and Technologies (MSST), 2011 IEEE*, May 23, 2011, pp. 1-5.

* cited by examiner

RESIDENTIAL GATEWAY MAKING AT LEAST ONE PRIVATE MEMORY SPACE AVAILABLE

This application is the U.S. national phase of International Application No. PCT/EP2014/067275 filed 12 Aug. 2014 which designated the U.S. and claims priority to FR Patent Application No. 13/58115 filed 22 Aug. 2013, the entire contents of each of which are hereby incorporated by reference.

The present invention relates to a residential gateway intended to be connected to a local area network and having available a memory space intended to be made available to at least one device connected to the local area network.

At the present time, many devices in a residential communication network incorporate hard disc drives. In particular hard disc drives are found incorporated in STB (Set Top Box) decoding devices and in residential gateways. A hard disc drive installed in a residential gateway typically implements NAS (Networked Attached Storage) network disc drive functions thus offering public memory space available to other devices connected to the residential communication network. A hard disc drive installed in an STB decoding device typically implements PVR (Personal Video Recorder) video recording functions and/or time shifting functions, thus offering a private memory space accessible only to the innards of the STB decoding device, in order to prevent a user recovering and making available via the Internet any audiovisual content recorded on the hard disc drive.

It is desirable to enable pooling these various uses of memory space in the same disc drive or group of disc drives, while complying with the constraint of public and private accessibility inherent in these uses.

It is also desirable to allow such pooling, while meeting a constraint of latency of access to the hard disc drive in the context of recordings and readings of audiovisual data, as is the case in the implementation of PVR video recording and time shifting functions.

It is in particular desirable to provide a solution that is simple to implement at low cost.

The invention relates to a residential gateway intended to be connected to a local area network, the residential gateway having a memory space intended to be made available to at least one device connected to the local area network. Said memory space comprising at least one private memory space, the residential gateway is such that it comprises: a table managing rights of access to said private memory space or spaces; means for receiving commands for access to said memory space and administrator commands for updating said access rights management table; means for updating said access rights management table, on receipt of an administrator command coming from a predetermined device implementing an administrator module, and for ignoring any administrator command coming from a device not implementing said administrator module; means for ignoring any command for access to said private memory space or spaces, when said command is received coming from a device not identified in said access rights management table. Thus, by implementing such a table managing rights of access to said private memory space or spaces and ensuring that only the administrator module or modules known to the residential gateway is or are in a position to modify this table, the aforementioned accessibility rules can be complied with, while enabling pooling the location of the memory spaces in the local area network. This enables in particular moving a hard disc drive normally incorporated in an STB decoding device to the residential gateway. Since the residential gateway is a device intended by nature to be permanently switched on, the STB decoding device can have access thereto whenever required, and no problem of energy regulation is posed, which would not have been the case by moving the hard disc drive from the residential gateway to the STB decoding device.

According to a particular embodiment, the residential gateway is adapted for receiving, via the local area network, said commands for access to said memory space in the form of link layer messages. Thus the latency in transmission and processing of these commands is significantly reduced compared with accesses by network or transport layer messages of the OSI (Open Systems Interconnection) model. In addition, since the processing operations are fewer, a processor with a lower performance can be used in the residential gateway.

According to a particular embodiment, the residential gateway is adapted for receiving, via the local area network, said commands for access to said memory space in the form of messages in accordance with the AoE protocol (ATA over Ethernet, ATA being the acronym for Advanced Technology Attachment). Thus implementation remains simple and compatible with off-the-shelf legacy devices.

According to a particular embodiment, the residential gateway comprises means for ignoring any command of the "MAC Mask List" type concerning said private memory space or spaces.

According to a particular embodiment, the residential gateway comprises a server for each private memory space, each server being adapted for filtering and processing the commands for access to said private memory space, and means for broadcasting a message describing the configuration of each server, said message including a description of the private memory space managed by said server.

According to a particular embodiment, the memory space further comprising at least one public memory space not taken into account by the access rights management table, the residential gateway comprises a server for each public memory space, the residential gateway comprises a queue in which each server managing a private or public memory space places commands for access to the memory space to be executed. Thus managing competing accesses to the same medium is simplified.

According to a particular embodiment, each server is associated with a priority level and each command for access to the memory space is placed in the queue according to the priority level associated with the server supplying said command to be executed. Thus it is possible to favour certain accesses compared with others, in order better to respond to latency constraints. For example, it is thus possible to execute as a priority accesses to the memory space for video applications of the PVR or time shifting type.

According to a particular embodiment, when the residential gateway is not the device implementing the administrator module, the residential gateway implements means for pairing the residential gateway with the device implementing the administrator module. Thus configuration is simple.

According to a particular embodiment, the gateway comprises: means for discovering devices connected to the local area network; means for representing the discovered devices via a user interface; means for enabling a user to define an association of at least one discovered device with each private memory space and with respective rights of access to said private memory space; and means for generating at least one administrator command for updating the access rights management table according to the defined association. Thus managing the access rights is simple.

The invention also relates to a method implemented by a residential gateway connected to a local area network, the residential gateway having a memory space made available to at least one device connected to the local area network. The method is such that, said memory space comprising at least one private memory space, the residential gateway comprising a table for managing rights of access to said private memory space or spaces, the residential gateway performs the following steps: receiving commands for access to said memory space and administrator commands for updating said access rights management table; updating said access rights management table on reception of an administrator command coming from a predetermined device implementing an administrator module, and ignoring any administrative command coming from the device not implementing said administrator module; and ignoring any command for access to said private memory space or spaces when said command is received coming from a device not identified in said access rights management table.

Figure 2:
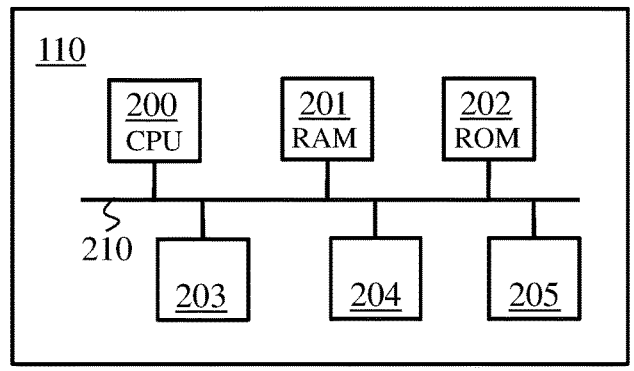
Figure 3:
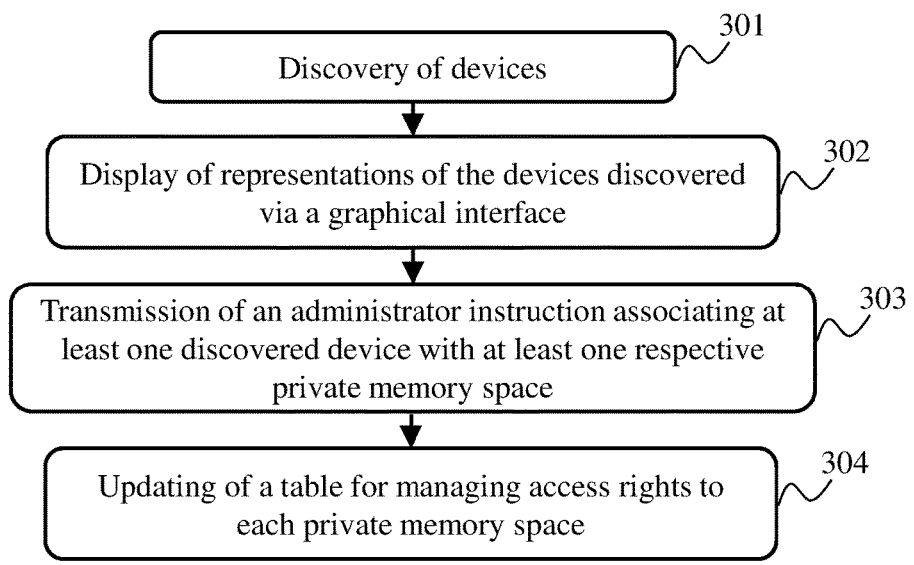
Figure 4:
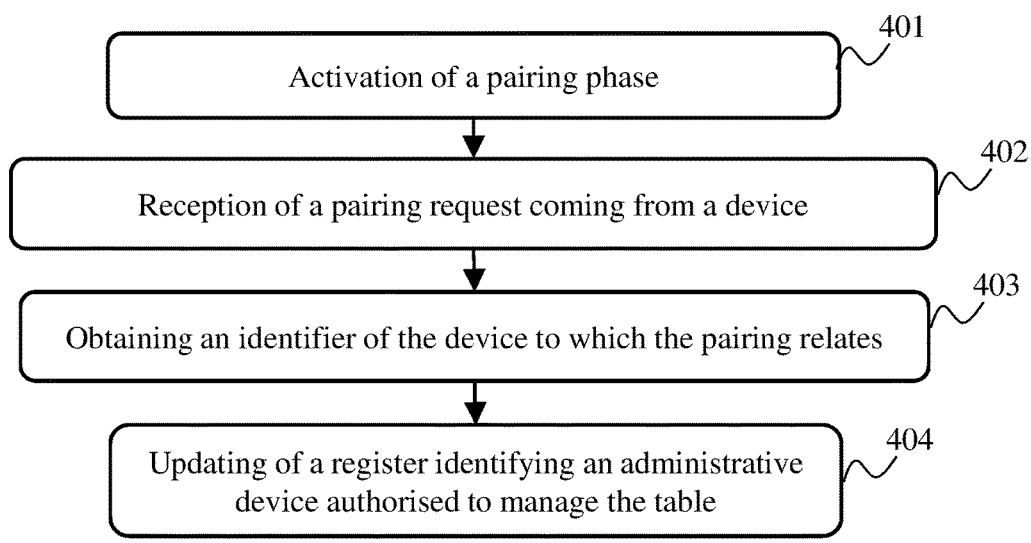
Figure 5:
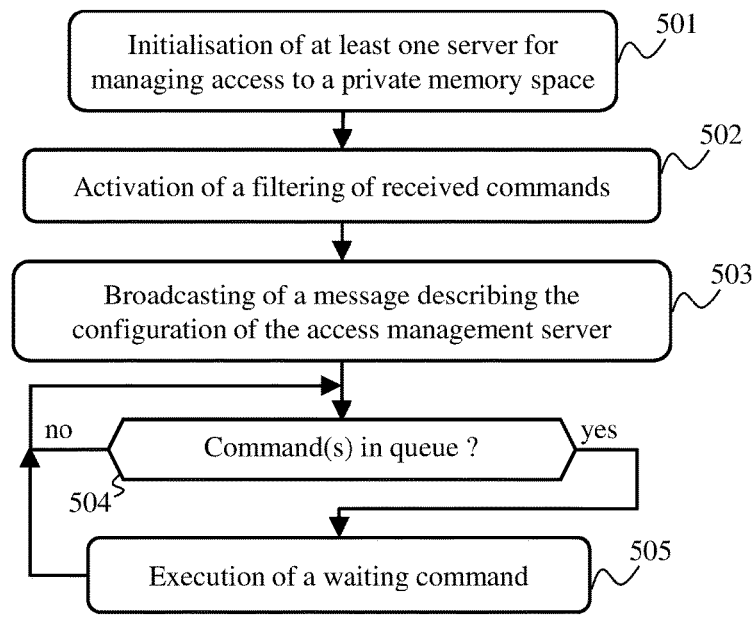
Figure 6:
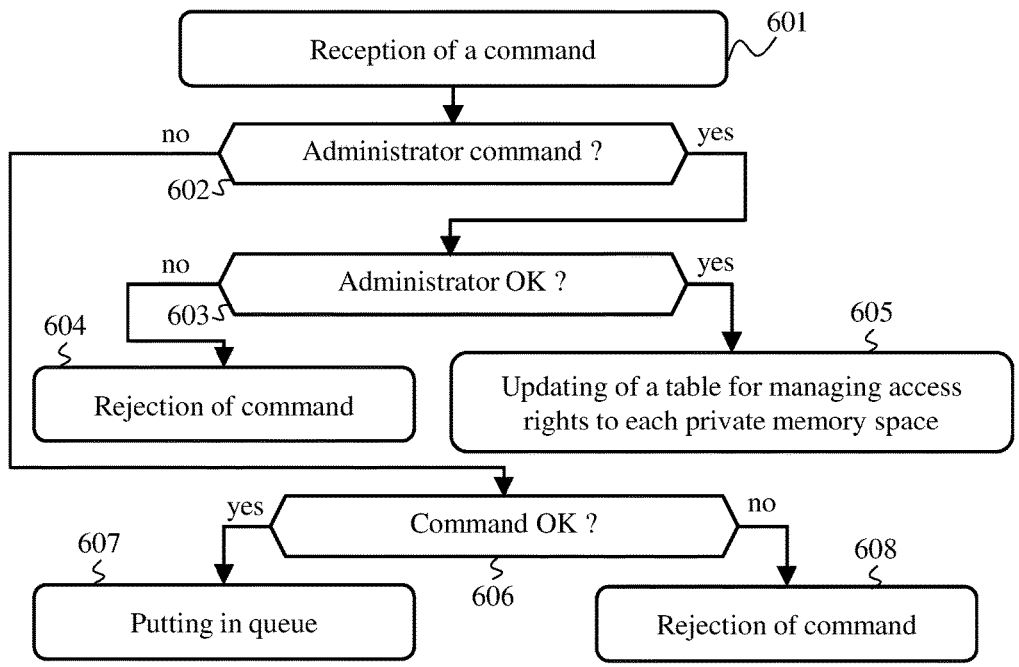

The features of the invention mentioned above, as well as others, will emerge more clearly from a reading of the following description of an example embodiment, said description being given in relation to the accompanying drawings, among which:

FIG. 1 schematically illustrates a communication network in which the present invention may be implemented;

FIG. 2 schematically illustrates an example of hardware architecture of a residential gateway of the communication network;

FIG. 3 schematically illustrates an algorithm for updating a table managing access rights to at least one private memory space in the context of the communication network;

FIG. 4 schematically illustrates an algorithm for declaring, to the residential gateway, a device administering said access rights management table;

FIG. 5 schematically illustrates an algorithm for processing commands received by the residential gateway in the context of managing accesses to at least one private memory space;

FIG. 6 schematically illustrates an algorithm for filtering commands received by the residential gateway in the context of managing accesses to at least one private memory space.

FIG. 1 schematically illustrates a Local Area Network LAN 120 in which the present invention may be implemented. The local area network 120 is based on a wired architecture, for example of the IEEE 802.3 type, and/or a wireless architecture, for example of the IEEE 8023.11 type. The local area network 120 comprises a set of devices 110, 111, 112, 113. The device 110 is a residential gateway interconnecting the local area network 120 and a Wide Area Network WAN 121. An example of hardware architecture of the residential gateway 110 is described below in relation to FIG. 2.

The devices 111 and 112 are devices supplying and/or consuming data, preferentially of the audiovisual type. For example, the device 111 is an STB decoding device having a capability of recording audiovisual data, as is the case in functions of the PVR or time shifting type, the device 112 is a display device of the electronic tablet type, and the device 113 is a Personal Computer PC.

The residential gateway 110 comprises a memory space 132 that comprises at least one private memory space 130, meaning a memory space accesses to which are enabled only from a device preregistered in an access rights management table. The memory space 132 may comprise at least one public memory space 131, meaning a memory space accesses to which does not require such prior registration of the device in the access rights management table. In other words, the access rights management table does not manage any public memory space. The public 131 and private 130 memory spaces may be located on separate media or be located on separate partitionings of the same medium. Hereinafter it is considered, by way of illustration, that the residential gateway 110 comprises at least one private memory space 130 and at least one public memory space 131.

A server 150 adapted for managing the accesses to said private memory space 130 is associated with each private memory space 130. Likewise, a server 151 adapted for managing accesses to said public memory space 131 is associated with each public memory space 131. In other words, the servers 150 and 151 are adapted for processing commands for access to said memory spaces 130 and 131 respectively, in read and/or write mode, coming from devices connected to the local area network 120. Unlike the server 151, the server 150 performs a prior filtering of the commands according to the content of the access rights management table. Each server 150 and 151 has a particular identifier, which is allocated thereto by the residential gateway 110.

In a particular embodiment, each server 150 and 151 is adapted for processing the commands in accordance with a data exchange protocol at the link layer level of the OSI model. The messages exchanged via the local area network 120 in the context of accesses to the memory space 132 are then link layer messages, also referred to as "level 2 messages". This significantly reduces the latency in transmission and processing of these messages, which accelerates the speed of access to the memory space 132. In a particular embodiment, these link layer messages are in accordance with the AoE protocol. This enables off-the-shelf legacy devices supplying and/or consuming data to benefit from the present invention, while keeping a simple design of the residential gateway 110.

The residential gateway 110 further comprises a table 140 for managing rights of access to each private memory space 130. An algorithm for updating the access rights management table 140 is described below in relation to FIG. 3.

As detailed hereinafter, in particular in relation to FIGS. 5 and 6, each server 150 responsible for a private memory space 130 filters the commands to be processed according to the device that generated the command and according to the devices and access rights entered previously in the access rights management table 140. The access rights management table 140 is populated by an administrator module or device 141. In FIG. 1, such an administrator module 141 is included in the residential gateway 110. In a variant embodiment, the administrator module 141 may be included in another device connected to the local area network 120. The access rights management table 140 may be populated by a plurality of administrator modules 141, provided that these administrator modules 141 are known as such to the residential gateway 110.

In a particular embodiment, the residential gateway 110 further comprises a module 142 managing priority of access to the memory space 132. Said module 142 managing priority of access is responsible for sequencing the commands for access to the memory space 132 coming from the servers 150 and 151. Managing the priorities of access to the memory space 132 is performed thanks to a queue in which the commands coming from the servers 150 and 151 are placed. The sequencing of these commands is provided according to priority levels allocated to the servers 150 and 151. The sequencing of these commands may further take into account the type of device connected to the local area network 120 that generated said commands, as well as the type of said commands.

FIG. 2 schematically illustrates an example of hardware architecture of the residential gateway 110. The residential gateway 110 then comprises, connected by a communication bus 210: a processor or Central Processing Unit CPU 200; a random access memory RAM 201; a read only memory ROM 202; at least one storage unit 203, such as a hard disc drive HDD, implementing the public and private memory spaces already mentioned; a storage medium reader, such as an SD (Secure Digital) card reader 204; and a set of interfaces 214 for communicating via the communication networks 120 and 121.

The processor 200 is capable of executing instructions loaded into the RAM 201 from the ROM 210, from an external memory (not shown), from a storage medium, or from a communication network. When the residential gateway 110 is powered up, the processor 200 is capable of reading instructions from the RAM 201 and executing them. These instructions form a computer program causing the implementation, by the processor 200, of all or some of the algorithms and steps described in relation to the residential gateway 110.

Thus all or some of the algorithms and steps described in relation to the residential gateway 110 may be implemented in software form through the execution of a set of instructions by a programmable machine, such as a Digital Signal Processor DSP or a microcontroller. All or some of the algorithms and steps described in relation to the residential gateway 110 may also be implemented in hardware form by a machine or a dedicated component, such as an Field-Programmable Gate Array FPGA or an Application-Specific Integrated Circuit ASIC.

FIG. 3 schematically illustrates an algorithm for updating the access rights management table 140.

In a step 301, the administrator module 141 obtains a list of identifiers of the devices connected to the local area network 120 and preferentially the type of these devices. For example, this list results from a discovery phase according to the Simple Service Discovery Protocol SSDP, as implemented in the context of the Universal Plug and Play UPnP standard.

In a following step 302, the administrator module 141 provides a display, via a Graphical User Interface GUI, of representations of the devices connected to the local area network 120. The display enables a user to select a device from those connected to the local area network 120 and to define rights of access, in read and/or write mode, to at least one private memory space 130. In a particular embodiment, the administrator module 141 also provides a display of a representation of each private memory space 130 created in the residential gateway 110, and enables a user to request that a new private memory space 130 be created within the residential gateway 110. This enables associating a device among those connected to the local area network 120 with a private memory space and defining the access rights thereof. Information allowing this representation of each new private memory space 130 may be requested by the administrator module 142 to the residential gateway 110.

Such a graphical interface GUI also enables the user to delete or redefine rights of access to each private memory space 130.

In a variant embodiment, the administrator module 141 negotiates, with the devices connected to the local area network 120, the rights of access to each private memory space 130. Each of these devices may include a set of specific instructions for this negotiation, such as for example an application in the case where said device is a tablet or smartphone.

In another variant embodiment, the administrator module 141 uses a pre-established definition of the rights of access to each private memory space.

In a following step 303, the administrator module 141 receives information representing a selection made by the user of a device among those connected to the local area network 120 and information representing access rights associated with said selected device. In the particular embodiment mentioned above in relation to the step 302, the administrator module 141 also receives information representing a private memory space to which said access rights relate, in particular when there may be ambiguity concerning the relevant private memory space. The administrator module 141 then transmits to the residential gateway 110 an administrator command requesting that the residential gateway 110 updates the access rights management table 140 with said information representing the selected device, the concerned private memory space (if this is not implicit) and access rights granted to said selected device with regard to said private memory space.

In the embodiment in FIG. 1 where the administrator module 141 is incorporated in the residential gateway 110, the administrator module 141 does not exchange information with the residential gateway 110 via the local area network 120 and acts directly on the access rights management table 140.

In a following step 304, the residential gateway 110 updates the access rights management table 140 according to the association information supplied by the administrator module 141 at the step 303.

Preferentially, in order to allow accesses to the private memory spaces in read and/or write mode at reduced latency, a data exchange protocol at the link layer of the OSI (Open Systems Interconnection) model is implemented, in this case, the MAC (Medium Access Control) addresses are used to identify the devices in the access rights managements table 140.

So as to ensure that only the administrator module 141 is in a position to request updates to the access rights management table 140, it is possible to write in non-volatile memory of the residential gateway 110 an identifier of the device implementing the administrator module 141, for example at the time of manufacturing of the residential gateway 110. The device implementing the administrator module 141 and the residential gateway 110 are then hard coupled.

In a preferred embodiment, the residential gateway 110 integrates the administrator module 141.

Methods for authenticating the device implementing the administrator module 141 with the residential gateway 110 may also be implemented to ensure in a more flexible manner that only the administrator module 141 is in a position to request updates to the access rights management table 140.

According to yet another variant, a pairing mechanism may be implemented, as described below in relation to FIG. 4.

FIG. 4 schematically illustrates an algorithm for declaring, to the residential gateway 110, a device implementing the administrator module 141 in the local area network 120.

In a step 401, the residential gateway 110 activates a pairing phase. The step 401 may be triggered following a predefined event, such as for example the detection of a pressing on a dedicated button of a control panel (physical, or virtual via a graphical interface GUI) of the residential gateway 110. The pairing phase may be activated for a predefined period or until a device has succeeded in pairing with the residential gateway 110, or until the residential gateway 110 detects another predefined event, such as for example a new detection of pressing on said dedicated button.

In a following step 402, the residential gateway 110 receives a pairing request, coming from a device connected to the local area network 120. The sending of this pairing request by said device may be triggered following a predefined event, such as for example the detection of pressing on a dedicated button of a control panel (physical, or virtual via a graphical interface GUI) of said device. In other words, the user, after having pressed on the residential gateway 110 on a first button dedicated to pairing, presses on the device implementing the administrator module 141 on a second button dedicated to pairing.

In a following step 403, the residential gateway 110 obtains, from the received pairing request, an identifier of the device that sent the pairing request.

In a following step 404, the residential gateway 110 updates an internal register in which an identifier of the device implementing the administrator module 141 is stored. The pairing phase is then ended. Only the device the identifier of which is stored in the register is then allowed to request updates to the table 140 managing rights of access to the private memory space or spaces.

FIG. 5 schematically illustrates an algorithm for processing commands received by the residential gateway 110 in the context of managing accesses to the memory space 132.

In a step 501, the residential gateway 110 initialises at least one server 150 adapted for managing accesses to at least one respective private memory space 130 and at least one server 151 adapted for managing accesses to at least one respective public memory space 131.

In a following step 502, the residential gateway 110 activates a filtering of commands received from devices connected to the local area network 120 and relating to accesses to at least one private memory space 130. Such a filtering is performed, as described below in relation to FIG. 6, by each server 150 managing accesses to the corresponding private memory space 130.

In a following step 503, the residential gateway 110 broadcasts, via the local area network 120, at least one message describing the configuration of each server 150 managing access to a private memory space 130, so as to signify to the devices connected to the local area network 120 that said server 150 is ready to accept commands Each message describing the configuration of a server 150 comprises an identification of the private memory space 130 managed by said server 150, for example by providing an indication of memory sectors constituting said private memory space 130. In addition, the residential gateway 110 broadcasts, via the local area network 120, at least one message describing the configuration of each server 151 managing access to a public memory space 131, so as to signify to the devices connected to the local area network 120 that said server 151 is ready to accept commands Each message describing the configuration of a server 151 comprises an indication of the public memory space 131 managed by said server 151, for example by providing an indication of memory sectors constituting said public memory space 131.

In the particular embodiment based on the AoE protocol, such messages are of the "Query Config Information Response" type.

In a following step 504, the residential gateway 110 checks whether at least one command for access to the memory space 132 is awaiting processing in the queue already mentioned. The commands are placed in the queue by the servers 150 and 151. If an access command is waiting in the queue, a step 505 is performed; otherwise the step 504 is repeated.

In the step 505, the residential gateway 110 retrieves from the queue a command to read from one memory space 130 or 131, or to write in one memory space 130 or 131, which is awaiting processing. Then the residential gateway 110 processes the retrieved command, meaning performs the write operation in the concerned memory space or the read operation in the concerned memory space. Each command being associated in the queue with an identifier of the server 150 or 151 that placed the command in the queue, the residential gateway 110 is able to provide a result of the write or read operation to the concerned server 150 or 151.

In a particular embodiment, each command placed in the queue is associated with an indication of priority. In this case, the residential gateway 110 processes first the top priority commands in the queue and, when several commands are of top priority, the residential gateway 110 processes first the oldest top priority command in the queue. It is then possible to give higher priority to the accesses to the private memory spaces 150 compared with the accesses to the public memory spaces 151.

FIG. 6 schematically illustrates an algorithm for filtering commands received by the residential gateway 110 in the context of managing accesses to the memory space 132.

In a step 601, the residential gateway 110 receives a command for access to the memory space 132.

In a step 602, the residential gateway 110 determines the type of the received command. If the command is an administrator command, meaning a command issuing from the device implementing the administrator module 141, a step 603 is performed; otherwise, if the command concerns a public memory space 131, the residential gateway 110 shall supply the command, for processing, to the concerned server 151 and, if the command concerns a private memory space 130, the residential gateway 110 shall supply the command, for processing, to the concerned server 150. Each write or read command comprises an indication of the concerned memory space 130 or 131 or an indication of a concerned portion of the memory space 130 or 131. In the particular embodiment already mentioned based on the AoE protocol, the write or read commands are of the "Issue ATA Command" type, in which the devices that sent said commands indicate which memory sectors are concerned. In addition, as described below, commands of the "MAC Mask List" type are accepted with regard to the public memory spaces 131, but not with regard to the private memory spaces 130. Indeed, so as not to disclose the list of devices having the right of access to a private memory space 130 nor to enable writing to such a list by clients in accordance with the AoE protocol, the server 150 in charge of said private memory space 130 ignores this type of command.

Thus, in a step 606, the concerned server analyses the received command in order to determine whether the command may be accepted by the residential gateway 110.

When the command is a command for access to a public memory space 131 and is consequently processed by one server 151, said server 151 checks the integrity of the command received and, in the case of a positive check, places the command in the queue in a step 607. When the command placed in the queue is processed by the residential gateway 110 at the step 505, the server 151 supplies a response to the device that sent the command, an identifier of said device being contained in the message that transported said command via the local area network 120. Thus, when the command is a write command, the server 151 generates, in response to said command, a message representing the failure or success of the associated write operation in the concerned public memory space 131; then the algorithm is ended. In the case where the command was received corrupted or when the received command comprises an inappropriate field or parameter, in a step 608, the server 151 generates in response to said command a message representing an error in the received command; then the algorithm is ended.

When the command is a command of the "MAC Mask List" type concerning a public memory space 131, the residential gateway 110 passes the command to the concerned server 151, which processes it in accordance with the AoE protocol.

When the command is a command for access to a private memory space 130 and is consequently processed by one server 150, said server 150 checks the integrity of the command received and, in the case of positive check, checks whether the device that sent the command is authorised to access said private memory space 130. To do this, the server 150 searches the access rights management table 140 and checks whether the device that sent the command is identified in said table 140 and whether the corresponding access rights allow performing the operation requested. When the device that sent the command is identified in the access rights management table 140 and the command received is in agreement with the access rights that are associated therewith for said private memory space 130, then the server 150 places the command in the queue in the step 607. When the command placed in the queue is processed by the residential gateway 110 at the step 505, the server 150 supplies a response to the device that sent the command, an identifier of said device being contained in the message that transported said command via the local area network 120. Thus, when the command is a write command, the server 150 generates in response to said command a message representing the failure or success of the associated write operation in the concerned private memory space 130; then the algorithm is ended. In the case where the command was received corrupted or when the received command comprises an inappropriate field or parameter, or when the command is not in agreement with the access rights defined in the access rights management table 140, in a step 608, the server 150 generates in response to said command a message representing an error in the received command; then the algorithm is ended.

When the command is a command of the "MAC Mask List" type concerning a private memory space 130 and this command is not an administrator command, the residential gateway 110 ignores said command.

When one server 150 or 151 places a command in the queue, said server 150 or 151 associates with said command the identifier of said server 150 or 151, in order to enable the residential gateway 110 subsequently to make the link between each processed command and the concerned server 150 or 151.

As already mentioned, each command in a queue may be associated with a priority level. Each command is then placed in the queue according to the priority level associated with the server supplying said command.

In the step 603, the residential gateway 110 processes the received administrator command. The command is therefore a command coming from the device implementing the administrator module 141. In the particular embodiment according to the AoE protocol, the command is of the "MAC Mask List" type. The command may concern the addenda in the table 140, vis-à-vis a private memory space 130, of a device of the local area network 120 and access rights associated with this device vis-à-vis said private memory space 130. The command may concern modification, in the table 140, of the access rights of a device of the local area network 120 vis-à-vis a private memory space 130. The command may concern deletion, from the table 140, of the access rights of a device of the local area network 120 vis-à-vis a private memory space 130. The algorithm is then ended.

The invention claimed is:

1. A residential gateway, the residential gateway having a memory space made available to at least one device connected to a local area network to which is connected the residential gateway,
wherein, said memory space comprising at least one private memory space, the residential gateway comprises a table managing rights of access of devices to the at least one private memory space, and the residential gateway is configured for:
receiving commands for access to said memory space and administrator commands for updating said table managing rights of access;
updating said table managing rights of access, on receipt of an administrator command coming from a predetermined device implementing an administrator module, and ignoring any administrator command coming from a device, different from the predetermined device, not implementing said administrator module; and
ignoring any command for access to the at least one private memory space, when said command is received from a device different from the predetermined device and not identified in said table managing rights of access, and
the residential gateway comprises a server for each of a plurality of private memory spaces, each of the servers filtering and processing the commands for access to the respective private memory space, and the residential gateway broadcasts a message describing a configuration of each of the servers, said message including a description of the private memory space managed by each of the servers.

2. The residential gateway according to claim 1, wherein the residential gateway is configured for receiving, via the local area network, said commands for access to said memory space in the form of link layer messages.

3. The residential gateway according to claim 2, wherein the residential gateway is configured for receiving, via the local area network, said commands for access to said memory space in the form of messages in accordance with the AoE protocol.

4. The residential gateway according to claim 3, wherein residential gateway is configured for ignoring any command of the "MAC Mask List" type of the protocol AoE concerning said private memory space or spaces.

5. The residential gateway according to claim 1, wherein, the memory space further comprising at least one public memory space not taken into account by the table managing rights of access, the residential gateway comprises a server for the public memory space, the residential gateway comprises a queue in which the server for each of the private memory spaces and the server for the public memory space places commands for access to the respective private or public memory space to be executed.

6. The residential gateway according to claim 5, wherein the server for each of the private memory spaces and the server for the public memory space are associated with a priority level and each command for access to a memory space is placed in the queue according to the priority level associated with the server for each of the private memory spaces and the server for the public memory space supplying said command to be executed.

7. The residential gateway according to claim 1, wherein, when the residential gateway is not the device implementing the administrator module, the residential gateway is configured for pairing the residential gateway with the device implementing the administrator module.

8. The residential gateway according to claim 1, wherein the residential gateway is configured for:
    discovering devices connected to the local area network;
    representing the discovered devices via a user interface;
    enabling a user to define an association of at least one discovered device with a private memory space and with respective rights of access to the private memory space; and
    generating at least one administrator command for updating the table managing rights of access according to the defined association.

9. A method implemented by a residential gateway connected to a local area network, the residential gateway having a memory space made available to at least one device connected to the local area network, wherein, said memory space comprising at least one private memory space, the residential gateway comprising a table for managing rights of access of devices to the at least one private memory space, the residential gateway performs:
    receiving commands for access to the at least one private memory space and administrator commands for updating said table for managing rights of access;
    updating said table for managing rights of access on reception of an administrator command coming from a predetermined device implementing an administrator module, and ignoring any administrative command coming from a device, different from the predetermined device, not implementing said administrator module; and
    ignoring any command for access to the at least one private memory space of the memory space when said command is received from a device, different from the predetermined device, not identified in said table for managing rights of access,
    wherein the residential gateway comprises a server for each of a plurality of private memory spaces, each server filtering and processing the commands for access to the respective private memory space, and the residential gateway broadcasts a me s sage describing a configuration of each server, said message including a description of the private memory space managed by each of the servers.

10. A non-transitory information storage medium storing a computer program comprising code instructions causing implementation, by a residential gateway processor, of the method according to claim 9 when said code instructions are read and executed by the residential gateway processor.

* * * * *